(12) United States Patent
Branagan

(10) Patent No.: US 7,309,807 B2
(45) Date of Patent: Dec. 18, 2007

(54) METHOD OF CONTAINING RADIOACTIVE CONTAMINATION

(75) Inventor: Daniel James Branagan, Idaho Falls, ID (US)

(73) Assignee: The NanoSteel Company, Inc., Providence, RI (US)

( * ) Notice: Subject to any disclaimer, the term of this patent is extended or adjusted under 35 U.S.C. 154(b) by 456 days.

(21) Appl. No.: 10/376,779

(22) Filed: Feb. 28, 2003

(65) Prior Publication Data

US 2007/0255084 A1 Nov. 1, 2007

(51) Int. Cl.
*G21F 9/00* (2006.01)
*G21F 9/20* (2006.01)
*G21F 9/34* (2006.01)
*G21F 1/00* (2006.01)
*G21F 9/28* (2006.01)

(52) U.S. Cl. ............................ 588/4; 588/15; 588/16; 252/478

(58) Field of Classification Search ................ 252/478
See application file for complete search history.

(56) References Cited

U.S. PATENT DOCUMENTS

| | | | |
|---|---|---|---|
| 2,773,823 A | 12/1956 | Goett | 204/193 |
| 2,987,406 A | 6/1961 | Minnick | 106/97 |
| 3,031,393 A | 4/1962 | Saur et al. | 204/193.2 |
| 3,088,903 A | 5/1963 | Firth | 204/193.2 |
| 3,434,978 A | 3/1969 | Vogel | 252/478 |
| 3,453,160 A | 7/1969 | Darling et al. | 156/39 |
| 4,279,697 A * | 7/1981 | Overhoff et al. | 376/328 |
| 4,300,056 A | 11/1981 | Gagneraud | 250/517 |
| 4,366,095 A | 12/1982 | Takats et al. | 252/633 |
| 4,735,767 A * | 4/1988 | Mallener et al. | 376/337 |
| 5,786,611 A | 7/1998 | Quapp et al. | 250/515.1 |
| 5,819,186 A | 10/1998 | Stephens | 588/3 |
| 5,949,084 A | 9/1999 | Schwartz | 250/506.1 |
| 6,064,710 A | 5/2000 | Singh | 367/272 |
| 6,125,912 A | 10/2000 | Branagan et al. | 164/46 |
| 6,166,390 A | 12/2000 | Quapp et al. | 250/506.1 |
| 6,226,341 B1 | 5/2001 | Strand | 376/338 |
| 6,699,439 B1 | 3/2004 | Dannert et al. | 422/159 |
| 2005/0258405 A1 * | 11/2005 | Sayala | 252/582 |

FOREIGN PATENT DOCUMENTS

| | | | |
|---|---|---|---|
| DE | 3119641 A1 * | 12/1982 | |
| DE | 3618966 A1 | 12/1987 | |
| DE | 195 45 761 A1 | 6/1997 | |
| JP | 1/176998 A | 7/1989 | |

OTHER PUBLICATIONS

USPTO obtained translation of JP 1-176998A (Jul. 13, 1989).*
USPTO obtained translation of DE 3618966A1 (Dec. 10, 1987).*
EPO abstract of DE 3119641 (Dec. 2, 1982).*
USPTO obtained translation of Schumann, Herbert (DE 3119641A1) Dec. 2, 1982.*
PCT International Search Report and Written Opinion mailed on Feb. 15, 2005, received in corresponding PCT application No. PCT/US04/06128 (13 pgs).
"FM3-4, NBC Protection" Chapter 4, (US Marine Corps) May 29, 1992, subsection—Earth-Shielded Positions (21 pgs).
"Primer on Spontaneous Heating and Pyrophoricity" Chapter "Pyrophoric Metals" (NTIS, Order No. DE95003576) Dec. 1994, section—Uranium, subsection—Carbon Microspheres (12 pgs).

* cited by examiner

*Primary Examiner*—Joseph D. Anthony
(74) *Attorney, Agent, or Firm*—Grossman Tucker Perreault & Pfleger, PLLC

(57) ABSTRACT

A method of controlling or containing radioactive contamination by providing a neutron absorbing material to a radioactive contamination site. Preferably the neutron absorbing material is present as a powder, granule, slurry or suspension, allowing the neutron absorbing material to blanket cover the radioactive contamination site. Suitable neutron absorbing materials include lanthanide elements having a cross section of 100 Barns or greater, as well as hafnium, zirconium, tantalum, silver, indium, and hydrogen.

3 Claims, No Drawings

METHOD OF CONTAINING RADIOACTIVE CONTAMINATION

FIELD OF THE INVENTION

The present invention is directed generally at neutron absorbing material, and more particularly at a method of using neutron absorbing materials to control and reduce the extent of damage and contamination resulting from an uncontrolled, unintended, or purposefully harmful release and distribution of radioactive materials.

BACKGROUND

Radioactivity involves spontaneous disintegration of unstable atomic nuclei by the emission of subatomic particles including alpha particles (helium ions), beta particles (electrons), and/or neutrons along with the emission of electromagnetic radiation including X-rays or gamma rays. Due to the charged nature of alpha and beta particles, their penetrating ability into matter is limited. However, electromagnetic radiation and especially neutrons can penetrate deeply into matter and thick physical barriers are necessary to provide adequate shielding. Neutron emission and subsequent bombardment is especially damaging to living system and has the unique quality that it can interact with the nucleus of many atoms and destabilize them to cause/promote additional radioactivity.

The release and subsequent interactions of neutrons with another atoms nucleus is the basis of nuclear fission. For example, when a neutron hits a uranium 235 atom, this atom in turn releases about 2.5 neutrons, on average, from the split nuclei. The neutrons released in this manner quickly cause the fission of two more atoms, thereby releasing four or more additional neutrons and thus a self-sustaining series of nuclear fissions, or a chain reaction is initiated resulting results in a sustainable release of nuclear energy. Analogously, when plutonium 239 itself absorbs a neutron, fission can occur, and on the average about 2.8 neutrons are released. Additionally, many atoms can be made radioactive after being hit with a neutron even though they are not capable of sustaining nuclear fission. Instead of releasing neutrons, these atoms release alpha particles, beta particles, and gamma radiation, all of which are highly damaging to living biological systems. Other classes of atoms, called neutron absorbers, can absorb neutrons and yet remain stable; i.e. not radioactive. Thermal neutrons (0 to 500 keV) are absorbed very effectively by specific elements including boron (or B-10 isotope), gadolinium, dysprosium, samarium, cadmium, or europium. Very high energy neutrons (1 to 15 MeV) are absorbed by elements such as zirconium, hafnium, tantalum, indium, hydrogen, or silver.

The power of the atom has been harnessed in several ways including the development of nuclear weapons and in nuclear power plants. Modern nuclear power plants are inherently safe, however, accidents have occurred in the past. In 1979, a nuclear accident occurred in the United States at the Three Mile Island PWR near Harrisburg, Pa. and a small amount of radioactivity escaped from the containment vessel. In 1986, one of four nuclear reactors at Chernobyl exploded and burned for an extended period of time and radioactive material spread over the Ukraine, Scandinavia, and northern Europe.

Since the terrorist attack on Sep. 11, 2001 in the United States, it has become increasingly apparent that the world is an inherently dangerous place. Terrorists, state enemies, criminals, etc. may have at their disposal a wide variety of mass destruction weapons including biological, chemical, and nuclear based weapons. This invention disclosure involves drastically reducing/minimizing the effects of nuclear based/derived weapons by the application of neutron absorber materials/particulates in various forms. Several key scenarios will be listed to give examples of the key embodiments of this invention. Other applications which are not listed but which are variations of this are also covered by this invention.

It has been known since the 1950's that neutron absorbers may be used to moderate the reaction rate in nuclear reactors. Additionally, in the 1990's, it was known that neutron absorbers may have uses in waste packages for the long term storage of nuclear waste. However, there has been no previous knowledge for using neutron absorber materials in the manner identified herein.

SUMMARY OF THE INVENTION

In a first embodiment, the present invention provides a method of controlling or containing radioactive contamination, the method comprising providing a neutron absorbing material, applying the neutron absorbing material to an open region of radioactive contamination, and absorbing emitted neutrons, thereby preventing expansion of radioactive contamination.

In another embodiment, the present invention provides a method of controlling or containing a nuclear reactor breach comprising providing a neutron absorbing material, applying said neutron absorbing material to said nuclear reactor in a region of a reactor core, and controlling a fission reaction of said nuclear reactor by absorbing emitted neutrons.

According to yet another embodiment, the present invention provides a method of protecting against radioactive exposure comprising supplying a neutron absorbing material, incorporating said neutron absorbing material into a construction material, and building a structure from said construction material incorporating said neutron absorbing material.

DESCRIPTION OF EXEMPLARY EMBODIMENTS OF THE INVENTION

The present invention provides methods of using selected neutron absorbing materials, and combinations of neutron absorbing materials to control and/or reduce the impact that an undesirable release of radioactive material can have on both humans and on the environment. According to the present invention, neutron absorbing materials may be employed in a curative or control capacity to limit the further damage and contamination after a release of radioactive material. Additionally, the present invention contemplates the use of neutron absorbing materials in a precautionary manner in which neutron absorbing materials are pre-positioned to prevent or control radioactive contamination.

Consistent with the preset invention neutron absorbing materials are materials which contains from 1 to 100 atomic percent of elements or combinations of elements which have microscopic cross sections for thermal neutrons greater than 100 Barns. Exemplary materials have high macroscopic cross sections arising from the distribution of high microscopic cross section elements contained within the neutron absorbing materials. These materials may contain lanthanides having a cross section greater than 100 Barns, for example gadolinium, europium, dysprosium, erbium, or samarium which may be in combination with other neutron absorbing elements such as hafnium, zirconium, tantalum, silver, indium, and hydrogen, which are especially effective for absorbing higher energy neutrons. When these materials are employed to absorb neutrons, the neutrons are prevented both from inflicting health problems as well as from perpetuating nuclear reaction or radioactive contamination.

According to a first exemplary embodiment, the present invention recognizes that, while nuclear power plants are inherently safe during general operating based on the many engineering safety controls, there is an increasing concern that nuclear power plants may be vulnerable to terrorist attack. An attack, for instance by an airplane hitting a nuclear power plant facility or using conventional explosives, could result in a reactor breech or deliberate destruction of the reactor cooling system resulting in overheating and loss of reaction containment resulting in a breech. In either case, radioactive elements could be released in to the atmosphere resulting in widespread contamination. Such a release of radioactive material could have continuing harmful effects for an extended period of time, as evidenced by the Chernobyl disaster where the reactor continued to release radioactive contaminants for many days until a physical containment barrier could by constructed by dropping liquid concrete from the air.

Consistent with the first exemplary embodiment, the invention provides a method of rapidly containing nuclear contamination and reducing or eliminating any ongoing contamination. In the event of a loss of reactor integrity, whether as a result of a mechanical failure, a terrorist attack, etc., the neutron absorbing powder may be used to blanket or cover the reactor to, thereby, shutdown the nuclear reaction, i.e., the nuclear fission. By absorbing the neutrons that are released during the fission reaction, the reaction may be slowed or stopped by reducing the neutrons available to perpetuate the nuclear chain reaction.

Consistent with the objective of blanketing, or otherwise covering and/or forming an encapsulating layer around the contaminating nuclear reaction, the neutron absorbing material may be provided in a variety of configurations. Most simply, the neutron absorbing material may be provided in a powder or granular configuration that will allow the neutron absorbing material to not only conform to varying geometries, but also to invade crevices, cracks, etc. Such powder or granular material may be airlifted and dropped onto a desired location and/or sprayed, as well as other suitable methods of transport and application. Additionally, the neutron absorbing material may be provided as a slurry or suspension, such as in a fluid or gel continuous phase that can be pumped under pressure to a desired location, as well as being airlifted or sprayed.

Additional containment of a breached reactor, or similar open source or radioactive contamination, may be achieved by providing the neutron absorbing powder mixed into cement. The cement can then be air-dropped, sprayed, or pumped on the reactor. Such a method of delivery will have the effect of transporting the neutron absorbing material to the reactor site as a suspension, such as disclosed above, However, when the concrete sets it will further provide a rugged, sealed physical barrier, i.e. sarcophagus. However, the cured concrete will still contain the neutron absorbing material, therein providing containment of radioactive contamination that exceeds what would be experienced by concrete alone.

According to a second exemplary embodiment, a method is provided for either controlling or containing general sources of radioactive contamination. For example, it is thought that it would be difficult for small terrorist groups to construct full scale nuclear fission or fusion weapons. Unfortunately, it is believed that it is much more within the capacity of such groups to procure radioactive materials that may be combined with conventional explosives. The result is a so called "dirty bomb" that, when detonated, will spread the radioactive material over a wide area producing potentially serious radioactive contamination.

In order to minimize the damage and health hazards at the point of attack or contamination, neutron absorbing materials can be used in a similar manner as the first embodiment. Specifically, neutron absorbing material as a powder, granule, slurry, suspension, paste, etc. may be applied to the contamination site. Desirably, neutron absorbing material may be employed at the contamination site before elements which can become activated and radioactive by neutron bombardment experience significant radiation exposure. For example, the cobalt in stainless steels when bombarded by neutrons can become radioactive, after which it may emit penetrating gamma radiation for tens if not thousands of years. Thus, to minimize health hazards after a dirty bomb attack, the contaminated area/site could be coated with neutron absorber materials which will absorb any neutrons prior to these neutrons contacting living flesh or materials which can be activated.

Consistent with the desire to provide rapid control or containment of a radioactive contaminated site, neutron absorbing material may be provided as a powder, granule, slurry, suspension, etc., as discussed above. Furthermore, the neutron absorbing material may be provided in an adhesive or high viscosity matrix allowing application to vertical or inverted surface. In such forms, the neutron absorbing material may conveniently be provided in man-portable dispensers. Such dispensers may be similar to fire extinguishers in size and operation. Accordingly, the man portable dispensers may be provided to emergency response workers, increasing the response time and decreasing the damage inflicted.

In a precautionary application according to further exemplary embodiments of the present invention, neutron absorbing materials may be incorporated into pre-positioned structures to provide protection against radiation exposure. For example, in the event of a nuclear explosion or widespread attack with dirty bombs, it may not be possible to move large numbers of people out of the contaminated area in a short time. Thus, for strategic planning, appropriate bomb shelters or safe areas may be set up in advance of any attack. Additionally, in some cases, civilians may be interested in providing additional protection to their homes or their personal bomb shelters. As mentioned previously, the most dangerous particle produced in a nuclear attack is highly penetrating neutrons. Thus, it may be especially important to protect civilians against the harmful effects of neutron bombardment.

According to this aspect of the present invention, neutron absorbing materials may be integrated with construction items. According to one example, powder or granular neutron absorbing material may be mixed in concrete. Any structures, walls, foundations, etc. produced from the concrete will contain the neutron absorbing material, and will eliminate or reduce neutron penetration into the structure. Similarly, neutron absorbing material may be incorporated into brick or cinderblock during the manufacture thereof to achieve the same result.

According to associated embodiments, neutron absorbing powder, granules, etc. may be incorporated into drywall. When used in construction, the neutron absorbing drywall will serve to reduce the passage of neutrons through the walls of a structure. In yet another exemplary embodiment, fine neutron absorbing particles may be mixed into paint prior to application. The paint may then be applied to surfaces in a conventional manner. By combining neutron absorber powders with construction materials as described above, houses, dwellings, and/or shelters may be produced with increased levels of survivability.

Referring to Table 1, exemplary neutron absorbing elements are listed along with the associated absorption cross-sections for 2200 m/s neutrons. Absorption cross-section (Thermal Neutron Cross Section) refers to the apparent or effective area presented by a target particle to an oncoming particle, or electromagnetic wave, and is a general measure of the probability of an interaction (absorption) between the target particle and the oncoming particle or electromagnetic wave. While all of the listed elements are especially effective for absorbing thermal neutrons (0 to 500 keV), the preferred embodiments the present invention utilize specific members of the lanthanide series having a cross section greater than 100 Barns, such as gadolinium, samarium, europium, erbium and dysprosium due to their high cross sections and relatively low cost.

TABLE 1

Information About Key Neutron Absorbing Elements/Isotopes

| Element/Isotope | Abundance | Thermal Neutron Cross Section (microscopic, Barns) |
|---|---|---|
| Boron | Natural | 761 |
| B-10 | 19.9% | 3,840 |
| Gadolinium | Natural | 48,800 |
| Gd-153 | | 20,000 |
| Gd-155 | 14.8% | 61,000 |
| Gd-157 | 15.65% | 254,300 |
| Gd-161 | | 20,600 |
| Cadmium | Natural | 2520 |
| Samarium | Natural | 5922 |
| Europium | Natural | 4530 |
| Dysprosium | Natural | 994 |

Additionally, in some applications, it may be desirable to mix these elements with still other elements which are more effective for absorbing very high energy neutrons (1 to 15 MeV). Exemplary elements which are especially effective for absorbing high energy neutrons include hafnium, zirconium, tantalum, silver, indium, and hydrogen. These high energy neutron absorbing elements can be conveniently incorporated into a solid material as a hydride.

Neutron absorbing materials consistent with the invention may contain low energy thermal neutron absorbing elements, high energy neutron absorbing elements or combinations of both. Additionally, since it does not matter how the neutron absorbing element is bound, it can also be used in a metal alloy or in a ceramic alloy. For example, gadolinium can be dissolved in specialized stainless steel alloys and then processed in to a powder form to produce a thermal neutron absorber. Alternately, gadolinium can be oxidized to form $Gd_2O_3$, and the oxide could then be used for thermal neutron absorption. The $Gd_2O_3$ may be an especially effective addition for paints which often incorporate oxide particles as pigments.

It is noteworthy in providing neutron absorbing materials that the neutron absorbing effectiveness of a particular element is independent of how it may be chemically bonded, assuming there has been no density change. This is because neutron absorption occurs in the nucleus of the atom. Chemical bonding is a function of the electron interactions of the atoms, and so does not effect the neutron absorption. Thus, highly neutron absorbing elements can be mixed together in solids either dissolved in a host lattice or via precipitation out of the lattice through the formation of distinct phase(s). While the microscopic cross section is due to a particular element, the material containing neutron absorbing elements has a macroscopic cross section that is dependent upon the distribution of alloying elements based on a volumetric basis. While one needs to calculate the macroscopic cross section in each particular case, the magnitude and value will be consistent with the make-up of the individual elements, i.e., high macroscopic cross sections are easily obtained by alloying with high microscopic cross section elements.

The present invention has been described above with reference to specific exemplary embodiments that are only intended to provide illustration and understanding. Accordingly, the invention should not be construes as being limited by the above description of exemplary embodiments, but rather only by the appended claims.

What is claimed is:

1. A method of controlling or containing radioactive contamination comprising:
   providing a neutron absorbing material comprising one or more of the lanthanide elements selected from the group consisting of gadolinium, samarium, europium, erbium and dysprosium in a portable dispenser;
   spraying said neutron absorbing material to a source of radioactive contamination from said portable dispenser;
   absorbing emitted neutrons of said radioactive contamination and controlling an expansion of said radioactive contamination;
   wherein said neutron absorbing material is mixed into cement or provided in an adhesive or provided in a high viscosity matrix.

2. The method of controlling or containing radioactive contamination according to claim 1 wherein said neutron absorbing material comprises a mixture further comprising at least one of hafnium, zirconium, tantalum, silver, indium, hydrogen, and mixtures thereof.

3. The method of controlling or containing radioactive contamination according to claim 1 wherein said neutron absorbing material is provided as one of a powder, a granule, a slurry, and a suspension.

* * * * *